June 9, 1964   R. J. ZUKOWSKI   3,136,390
BRAKE ANCHOR PIN ASSEMBLY
Filed Nov. 12, 1963
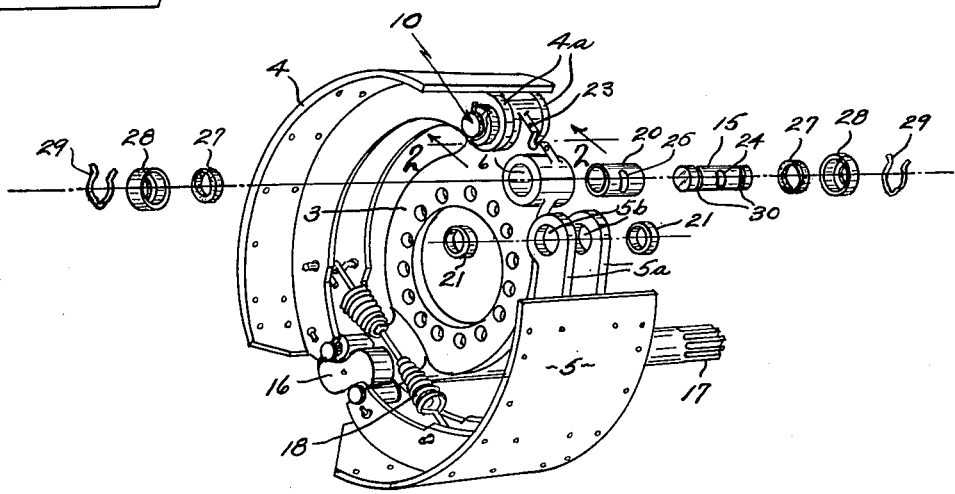
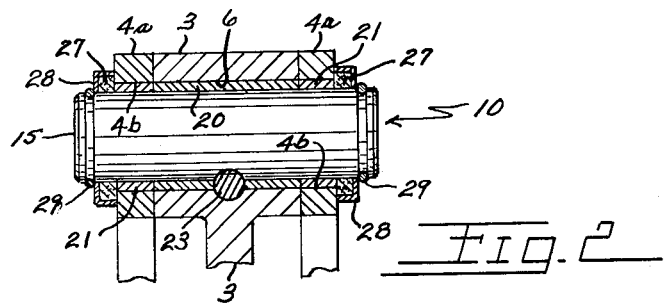
INVENTOR.
RAYMOND J. ZUKOWSKI
BY
Meyer, Baldwin, Doran & Egan
ATTORNEYS

United States Patent Office 3,136,390
Patented June 9, 1964

3,136,390
BRAKE ANCHOR PIN ASSEMBLY
Raymond J. Zukowski, Euclid, Ohio, assignor to The Euclid Automatic Machining Company, Euclid, Ohio, a corporation of Ohio
Filed Nov. 12, 1963, Ser. No. 322,912
4 Claims. (Cl. 188—78)

This invention relates to an anchor pin assembly especially designed though not limited for use in an internal brake for a trailer, truck, bus and the like and incorporates an internal brake having a spider and a pair of expanding brake shoes pivotably mounted on said spider by an anchor pin assembly of the present invention.

In the past, anchor pins for expanding brake shoes of an internal brake assembly for a trailer have frequently been frozen in the pin holes provided in the spider. When changing the brake shoe linings and in replacing the anchor pins that have been frozen in the spider openings, the brake spiders frequently have been bent resulting in high labor and high parts costs for repairing the internal brake assemblies. In addition to the freeze-up of the anchor pins and the bending of the brake spider, the anchor pin holes in the spider and the anchor pin holes in the brake shoes have become excessively worn making replacement of these parts necessary.

It is an object of the present invention to provide a brake anchor pin assembly for an internal trailer brake having expandable brake shoes in which the use of the assembly prevents freeze-up of brake anchor pins, bending of brake spiders, wearing of the spider anchor pin holes and wearing of the brake shoe holes.

It is an object of the present invention to provide an improved brake anchor pin assembly for an internal brake of a trailer, truck, bus or the like wherein the brake has a pair of expanding brake shoes pivotably mounted on a brake spider by the anchor pin assembly.

It is an object of the present invention to provide a brake anchor pin assembly that prevents the freeze-up of brake anchor pins, the bending of brake spiders, the wearing of spider anchor pin holes, and the wearing of brake shoe anchor pin holes, the pin assembly comprising of a pair of hard chrome plated steel pins, a stainless steel bushing for each anchor pin opening in the spider, and a pair of stainless steel bushings for openings in one of a pair of brake shoe webs, each of these webs attaching each of the shoes to the spider.

It is an object of the present invention to provide a brake anchor pin assembly that prevents the freeze-up of brake anchor pins and an assembly that can easily and quickly be removed and replaced without welding, reaming or drilling.

Other objects will become apparent from the specification that follows, the appended claims, and the drawings in which:

FIG. 1 is a perspective view of a brake spider and a pair of expanding brake shoes pivotably attached thereto by a pair of anchor pin assemblies, one pin assembly being shown in an exploded view and the other being shown fully assembled; and FIG. 2 is a fragmentary sectional view taken along the line indicated at 2—2 in FIG. 1 and on an enlarged scale.

The present invention provides an internal brake assembly comprising a brake spider 3 and a pair of expanding brake shoes 4 and 5. The brake shoe 4 has a pair of brake shoe webs 4a with a pair of aligned openings 4b therewithin and brake shoe 5 has a pair of webs 5a with a pair of aligned openings 5b whereby the shoes are pivotably mounted on the spider through a spider anchor pin opening 6. Each web of each shoe is pivotally attached to brake spider by means of an anchor pin assembly 10 comprising an anchor pin 15 disposed in one of the spider pin openings 6 and its corresponding brake shoe web openings 5b.

As commonly used in internal brakes of the expanding brake shoe type, the shoes are expanded by the movement of a cam 16 driven by a shaft 17, the shoe being returned to place by a spring 18 when the brake is released and in a non-braking position.

In the perspective view of FIG. 1, the left-hand anchor pin assembly is shown fully in place in an assembled condition while the right-hand anchor pin assembly is shown in an exploded view to help illustrate the relationship of the various parts of the completed brake assembly.

To help prevent the freeze-up of the anchor pin 15, as well as to also prevent the bending of the spider while attempting to remove such a frozen pin, each spider pin opening 6 is provided with a stainless steel bushing 20 for mounting the pin therein. As seen in FIG. 1 and FIG. 2, each web opening 5b has a stainless steel bushing 21 of about the same internal diameter as the bushing 20 for pivotally holding the pin 15 in the web opening.

In the preferred construction shown in FIGS. 1 and 2, a centering pin 23 can be used to center and hold the anchor pin 15 and bushing 20 in assembled position within the spider 3 wherein the brake shoe pivots around the pin 15. A central opening 24 is provided in pin 15 and a central groove 25 is provided in the bushing 20 for engagement with the pin 23 to center and lock the anchor pin 15. To prevent the entry of foreign matter into the pin openings 6 and 5b, a felt washer 27, a retainer 28 and a lock ring 29 are provided on each end of each of the anchor pins 15. A marginal end groove 30 is provided at each end of each of the pins 15 for engagement with its corresponding lock ring 29. Any suitable means may be utilized to provide adequate lubrication between the contacting surfaces of the pin and bushing or, in the alternative, said elements may be self-lubricating.

As previously indicated, the use of the anchor pin 15, which is preferably made of hardened steel and hard chrome plated steel, with the abrasion resistant and corrosion resistant bushing 20 and the bushings 21 (said bushings being preferably made of stainless steel) help to prevent freeze-up of the anchor pin, bending of the brake spider, wearing of the spider anchor pin openings, and wearing of the brake shoe anchor pin openings in each brake shoe web thereof. Thus, the pin assembly 10 can be easily and quickly used and replaced.

It will be understood that the above description is by way of illustration rather than of limitation and that, in accordance with the provisions of the patent laws, variations and modifications of the specific articles disclosed herein may be made without departing from the spirit of the invention.

What is claimed is:

1. An internal brake for a trailer, truck or bus comprising a spider and a pair of expanding brake shoes, an anchor pin assembly comprising a pair of anchor pins, a pair of anchor pin openings in the spider and a central corrosion resistant metal bushing within each of the pin openings, each anchor pin being disposed within one of the central bushings, a pair of brake shoe webs, each web having a pair of openings therein aligned with one of the anchor pin openings for pivotally mounting each of said shoes on said spider, a corrosion resistant bushing in each of the web openings for rotational movement of each of the shoes around its corresponding anchor pin, each of the end portions of each pin having a felt washer, a retainer and a lock ring to prevent entry of foreign matter between said pin and its corresponding brake shoe web bushings.

2. An internal brake for a trailer comprising a spider and a pair of expanding brake shoes, an anchor pin assembly comprising a pair of hard chrome plated anchor pins, a pair of anchor pin openings in the spider and a central stainless steel bushing within each of the pin openings, each anchor pin being disposed within one of the central bushings in one of the pin openings, a pair of webs, each web having a pair of openings therein aligned with one of the anchor pin openings for pivotably mounting each of said shoes on said spider, a stainless steel bushing in each of the web openings for rotational movement of each of the shoes around its corresponding anchor pin, each of the end portions of each pin having a felt washer, a retainer and a lock ring to prevent entry of foreign matter between said pin and its corresponding web bushings, and an opening near each of the anchor pin openings on the spider and a centering pin disposed within the opening adapted to engage the anchor pin and its central bushing to center and hold said bushing and pin in place in their anchor pin opening.

3. An internal brake assembly having a pair of expanding brake shoes and a spider containing a pair of anchor pin openings for pivotal movement of the shoes, each shoe having a web with a pair of openings aligned with one of the anchor pin openings, a hard chrome plated steel anchor pin disposed within each of the anchor pin openings and its corresponding pair of web openings, a central stainless steel bushing disposed in each of the anchor pin openings between the pin and said spider, an outer bushing for each of said pins disposed between said pin and each of its corresponding web openings.

4. In an internal brake assembly adapted for use in a trailer brake, in which a pair of expanding brake shoes are pivotably attached to a brake spider, the spider having a pair of anchor pin openings near one end thereof for pivotably attaching the brake shoes and each brake shoe having a web with two openings that are aligned with their corresponding anchor pin opening, one opening of the web being adjacent one end of the corresponding anchor pin opening and the other web opening being adjacent the other end of the pin opening, the improvement therein comprising a brake anchor pin assembly including a central stainless steel bushing in each anchor pin opening, an anchor pin located within each of the central bushings in the corresponding anchor pin opening, a pair of stainless steel bushings in each of the aligned web openings, each web bushing having the same internal diameter as the central bushing and having disposed therewithin one of the ends of the anchor pin, each anchor pin having a central groove for locking, and each bushing in each of the anchor pin openings having a central slot for locking.

UNITED STATES PATENTS

References Cited in the file of this patent 2,277,577    Boldt _____ Mar. 24, 1942